US011016518B2

(12) United States Patent
Yang

(10) Patent No.: US 11,016,518 B2
(45) Date of Patent: May 25, 2021

(54) VOLTAGE SUBTRACTER AND OPERATION METHOD FOR SUBTRACTING VOLTAGES

(71) Applicant: MACRONIX International Co., Ltd., Hsinchu (TW)

(72) Inventor: Yih-Shan Yang, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 75 days.

(21) Appl. No.: 16/217,919

(22) Filed: Dec. 12, 2018

(65) Prior Publication Data

US 2019/0354130 A1   Nov. 21, 2019

(30) Foreign Application Priority Data

May 21, 2018   (TW) ................................ 107117188

(51) Int. Cl.
G05F 3/16      (2006.01)
G06F 7/485     (2006.01)
H02M 3/07      (2006.01)

(52) U.S. Cl.
CPC .............. *G05F 3/16* (2013.01); *H02M 3/07* (2013.01); *G06F 7/485* (2013.01)

(58) Field of Classification Search
CPC ............ G05F 3/16; G05F 3/205; H02M 3/07; H02M 3/073; H02M 2003/072; H02M 2003/075; H02M 2003/076; H02M 2003/077; H02M 2003/078; H02M 2003/071; H02M 3/04; H02M 3/06; G11C 5/145; G11C 16/06
USPC ............................................... 363/59, 60, 62
See application file for complete search history.

(56) References Cited

U.S. PATENT DOCUMENTS

| | | |
|---|---|---|
| 4,888,725 A | 12/1989 | Matney |
| 5,408,194 A | 4/1995 | Steinbach et al. |
| 5,768,116 A * | 6/1998 | Kompelien ............. H02M 3/07 |
| | | 307/110 |
| 7,233,190 B2 | 6/2007 | Tanzawa |
| 7,336,126 B2 | 2/2008 | Donig |

(Continued)

FOREIGN PATENT DOCUMENTS

| | | |
|---|---|---|
| CN | 105049025 | 11/2015 |
| TW | 201724747 | 7/2017 |

OTHER PUBLICATIONS

"Office Action of Taiwan Counterpart Application," dated Jun. 27, 2019, p. 1-p. 10.

*Primary Examiner* — Thienvu V Tran
*Assistant Examiner* — Ivan Laboy
(74) *Attorney, Agent, or Firm* — J.C. Patents

(57) ABSTRACT

A voltage subtracter includes a first charge storage device and a second charge storage device. The first charge storage device receives a first voltage and a second voltage during a first time period, and storages a first difference voltage between the first voltage and the second voltage. The second charge storage device receives a reference ground voltage and the first voltage during a second time period, and storages a second difference voltage between the reference ground voltage and the first voltage. The first charge storage device and the second charge storage device are coupled to an output end during a second time period, and a charge sharing operation is operatedon the first charge storage device and the second charge storage device to generate an output voltage on the output end.

17 Claims, 2 Drawing Sheets

(56) References Cited

U.S. PATENT DOCUMENTS 8,531,324 B2 9/2013 Sicard
2010/0134177 A1* 6/2010 Hsu ..................... H02M 3/073
327/536
2020/0067405 A1* 2/2020 Hung ................... H02M 3/073

* cited by examiner

VOLTAGE SUBTRACTER AND OPERATION METHOD FOR SUBTRACTING VOLTAGES

CROSS-REFERENCE TO RELATED APPLICATION

This application claims the priority benefit of Taiwan application serial no. 107117188, filed on May 21, 2018. The entirety of the above-mentioned patent application is hereby incorporated by reference herein and made a part of this specification.

BACKGROUND

Field of the Invention

The invention relates to a voltage subtracter and an operation method for subtracting voltages and more particularly, to a voltage subtracter and an operation method for subtracting voltages which are analog voltages.

Description of Related Art

In the related art, an operational amplifier is commonly used to carry out a design of a voltage subtracter. The voltage subtracter of such type requires a larger circuit area, and more particularly, in the need to achieve small power consumption, configuration of resistors with greater resistances is usually required in order to reduce consumption currents, which results in the increase of the circuit area. Moreover, based on restrictions of a voltage operation range of the operational amplifier, an operation range of the voltage subtracter of such type is also restricted.

Another voltage subtracter which requires no operational amplifier is further provided in the related art. The voltage subtracter of such type requires capacitors for operating a voltage subtraction operation. However, as there is a certain degree of parasitic capacitance in the circuit of the voltage subtracter, a difference voltage level calculated by the voltage subtracter of such type will be affected by the parasitic capacitance, and as a result, accuracy thereof will be reduced.

SUMMARY

The invention provides a voltage subtracter and an operation method for subtracting voltages which can achieve improving accuracy of a calculated difference voltage level.

According to an embodiment of the invention, a voltage subtracter including a first charge storage device and a second charge storage device is provided. The first charge storage device receives a first voltage and a second voltage during a first time period and stores a first difference voltage between the first voltage and the second voltage. The second charge storage device receives the first voltage and a reference ground voltage during the first time period and stores a second difference voltage between the first voltage and the reference ground voltage. The first charge storage device and the second charge storage device are coupled to an output end during a second time period, such that a charge sharing operation is operated on the first charge storage device and the second charge storage device, so as to generate an output voltage on the output end. The first time period is before the second time period.

According to an embodiment of the invention, an operation method for subtracting voltages is provided and includes: providing a first charge storage device to receive a first voltage and a second voltage during a first time period and store a first difference voltage between the first voltage and the second voltage; providing a second charge storage device to receive the first voltage and a reference ground voltage during the first time period and store a second difference voltage between the first voltage and the reference ground voltage; and coupling the first charge storage device and the second charge storage device to an output end during a second time period, such that a charge sharing operation is operated on the first charge storage device and the second charge storage device to generate an output voltage on the output end. The first time period is before the second time period.

Based on the above, the invention provides the first charge storage device to store the first difference voltage between the first voltage and the second voltage and further provides the second charge storage device to store the second difference voltage between the first voltage and the reference ground voltage. Through operating the charge sharing operation on the first charge storage device and the second charge storage device on the output end, the generated output voltage affected by a parasitic capacitance on the output end can be reduced. In a condition that the circuit area is not increased, the output voltage proportional to the voltage difference between the first voltage and the second voltage can be obtained.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
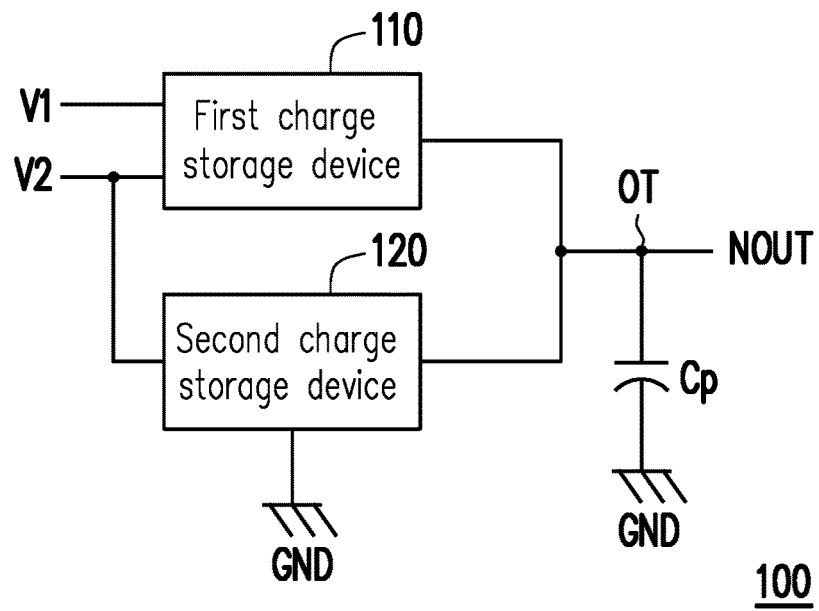
FIG. 1 is a schematic diagram illustrating a voltage subtracter according to an embodiment of the invention.

Referring to FIG. 1, FIG. 1 is a schematic diagram illustrating a voltage subtracter according to an embodiment of the invention. A voltage subtracter 100 of the present embodiment includes a first charge storage device 110, a second charge storage device 120 and a parasitic capacitor Cp. The first charge storage device 110 receives a first voltage V1 and a second voltage V2 and is coupled to an output end OT. The second charge storage device 120 receives the first voltage V1 and a reference ground voltage GND and is coupled to the output end OT. The parasitic capacitor Cp is connected in series between the output end OT and the reference ground voltage GND.

Regarding operations, the first charge storage device 110 receives the first voltage V1 and the second voltage V2 during a first time period and stores a first difference voltage between the second voltage V2 and the first voltage V1. During the aforementioned first time period, the second charge storage device 120 receives the first voltage V1 and the reference ground voltage GND and stores a second difference voltage between the first voltage V1 and the reference ground voltage GND. Then, during the second time period after the first time period, the first charge storage device 110, the second charge storage device 120 and the parasitic capacitor Cp are coupled to one another through the output end OT, and in the meantime, a charge sharing is operated among the first charge storage device 110, the second charge storage device 120 and the parasitic capacitor Cp, and after the charge sharing operation is completed, an output voltage VOUT is generated on the output end OT.

Figure 2:
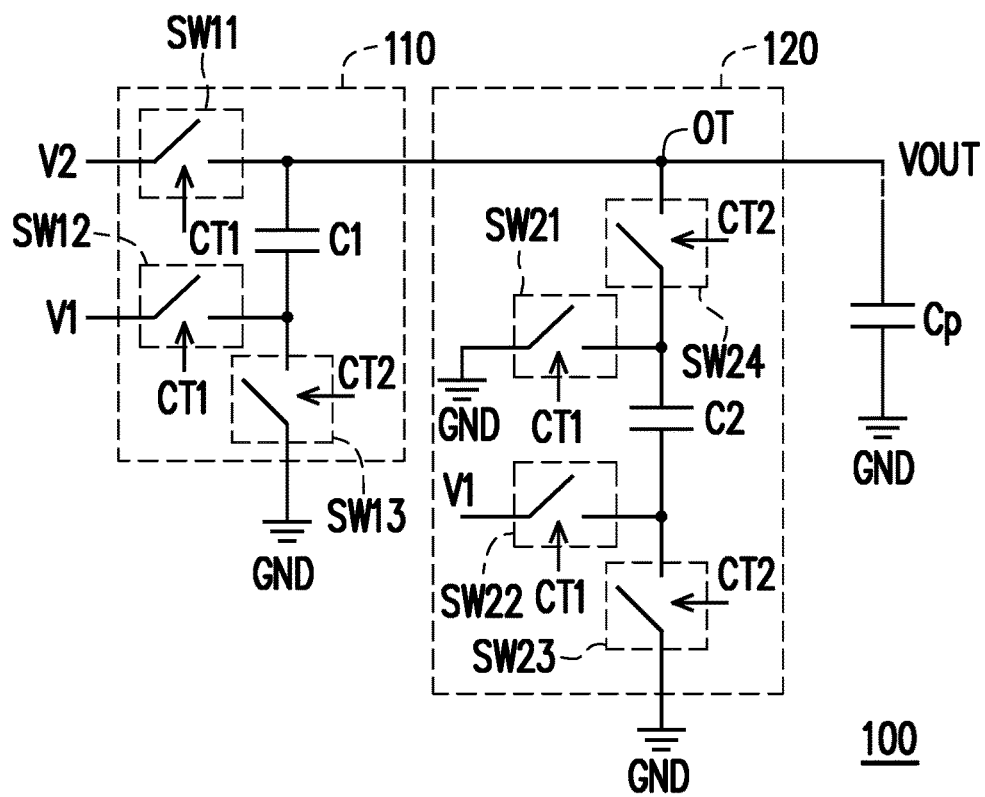
FIG. 2 is a schematic circuit diagram illustrating the voltage subtracter of the embodiment of the invention depicted in FIG. 1.

Regarding operation details of the embodiment of the invention, referring to FIG. 2, FIG. 2 is a schematic circuit diagram illustrating the voltage subtracter 100 of the embodiment of the invention depicted in FIG. 1. In FIG. 2, the first charge storage device 110 includes switches SW11-SW13 and a capacitor C1. First ends of the switch SW11 and the switch SW12 respectively receive the second voltage V2 and the first voltage V1, and second ends of the switch SW11 and the switch SW12 are respectively coupled to a first end and a second end of the capacitor C1. In addition, the first end of the capacitor C1 is further coupled to the output end OT, the second end of the capacitor C1 is further coupled to a first end of the switch SW13, and a second end of the switch SW13 receives the reference ground voltage GND.

The second charge storage device 120 includes switches SW21-SW24 and a capacitor C2. First ends of the switch SW21 and the switch SW22 respectively receive the reference ground voltage GND and the first voltage V1. Second ends of the switch SW21 and the switch SW22 are respectively coupled to a first end and a second end of the capacitor C2. The first end of the capacitor C2 is further coupled to an end of the switch SW24, and the other end of the switch SW24 is coupled to the output end OT. The second end of the capacitor C2 is coupled to a first end of the switch SW23, and a second end of the switch SW23 receives the reference ground voltage GND.

In the present embodiment, the switches SW11, SW12, SW21 and SW22 are controlled by a control signal CT1 to be turned on or turned off. The switches SW13, SW23 and SW24 are controlled by the control signal CT2 to be turned on or turned off. Further, each of the switches SW11, SW12, SW21, SW22, SW13, SW23 and SW24 may be a transistor switch constructed by a transistor, and when the switches SW11, SW12, SW21, SW22, SW13, SW23 and SW24 are the same type, the control signal CT1 and the control signal CT2 may be inverted signals to each other, and the control signal CT1 and the control signal CT2 may be two non-overlapped signals. In a specified time period (also called deadtime period), the control signals CT1 and CT2 are all kept in low level (disable level) to avoid from a short current been passed through the switches SW12 and SW13 for instance. Certainly, in other embodiments of the invention, if the type of the switches SW11, SW12, SW21 and SW22 is inverted to the type of the switches SW13, SW23 and SW24, the control signal CT1 and the control signal CT2 may be non-inverted signals to each other, and the control signal CT1 and the control signal CT2 may also be two non-overlapped signals.

Regarding the operations, during the first time period, the switches SW11, SW12, SW21 and SW22 are controlled by the control signal CT1 and are turned on, while the switches SW13, SW23 and SW24 are controlled by the control signal CT2 and turned off (cut-off). In this circumstance, the two ends of the capacitor C1 respectively receive the first voltage V1 and the second voltage V2, and the capacitor C1 stores the first difference voltage between the first voltage V1 and the second voltage V2. Further, the two ends of the capacitor C2 respectively receive the reference ground voltage GND and the first voltage V1, and the capacitor C2 stores the second difference voltage between the reference ground voltage GND and the first voltage V1. In detail, the switches SW11, SW12, SW21 and SW22 are turned on after the switches SW13, SW23 and SW24 are turned off, and the switches SW13, SW23 and SW24 are turned on after the switches SW11, SW12, SW21 and SW22 are turned off.

Based on the description set forth above, during the first time period, a charge stored in the capacitor C1 is equal to $(V1-V2) \times C1$, and a charge stored in the capacitor C2 is equal to $(GND-V1) \times C2$. In a condition that a level of the reference ground voltage GND is 0V, the charge stored in the capacitor C2 is equal to $-V1 \times C2$. In addition, during the first time period, the second voltage V2 may charge the parasitic capacitor Cp through the switch SW11. Namely, during the first time period, a charge stored in the parasitic capacitor Cp is $V2 \times Cp$.

Then, during the second time period after the first time period, the switches SW11, SW12, SW21 and SW22 are controlled by the control signal CT1 to be turned off, while the switches SW13, SW23 and SW24 are controlled by the control signal CT2 to be turned on. In this way, the capacitor C1, the capacitor C2 and the parasitic capacitor Cp are all coupled to the output end OT, and the charge sharing operation is operated thereon.

While the charge sharing operation is operated, a total charge provided by the capacitor C1, the capacitor C2 and the parasitic capacitor Cp is equal to $(V1-V2) \times C1 - V1 \times C2 + V2 \times Cp$. After the charge sharing operation is completed, the output voltage VOUT on the output end OT may be expressed by formula (1):

$$VOUT = \frac{(V2 - V1) \times C1 - V1 \times C2 + V2 \times Cp}{C1 + C2 + Cp} \quad (1)$$

Formula (1) may be adapted as formula (2), which is expressed as follows:

$$VOUT = (V2 - V1) \times \frac{C1 + Cp}{C1 + C2 + Cp} \quad (2)$$

According to formula (2), the output voltage VOUT generated by the voltage subtracter 100 of the embodiment of the invention may be equal to a product of the voltage difference between the first voltage V1 and the second voltage V2 multiplied by a ratio, where the ratio may be determined according to capacitance values of the capacitor C1, the capacitor C2 and the parasitic capacitor Cp. Therein, when the capacitance value of the capacitor C2 is equal to that of the parasitic capacitor Cp, the ratio may be a constant.

It is to be mentioned that the actual voltage difference between the first voltage V1 and the second voltage V2 may be accurately obtained according to the voltage level of the output voltage VOUT divided by the aforementioned ratio.

It is to be additionally mentioned that the first voltage V1 and the second voltage V2 may be analog voltages. In addition, in the voltage subtracter 100 of the embodiment of the invention, neither any operational amplifier nor any circuit element for providing a great resistance or a great capacitance value is required, and the required circuit area may therefore be reduced.

Figure 3:
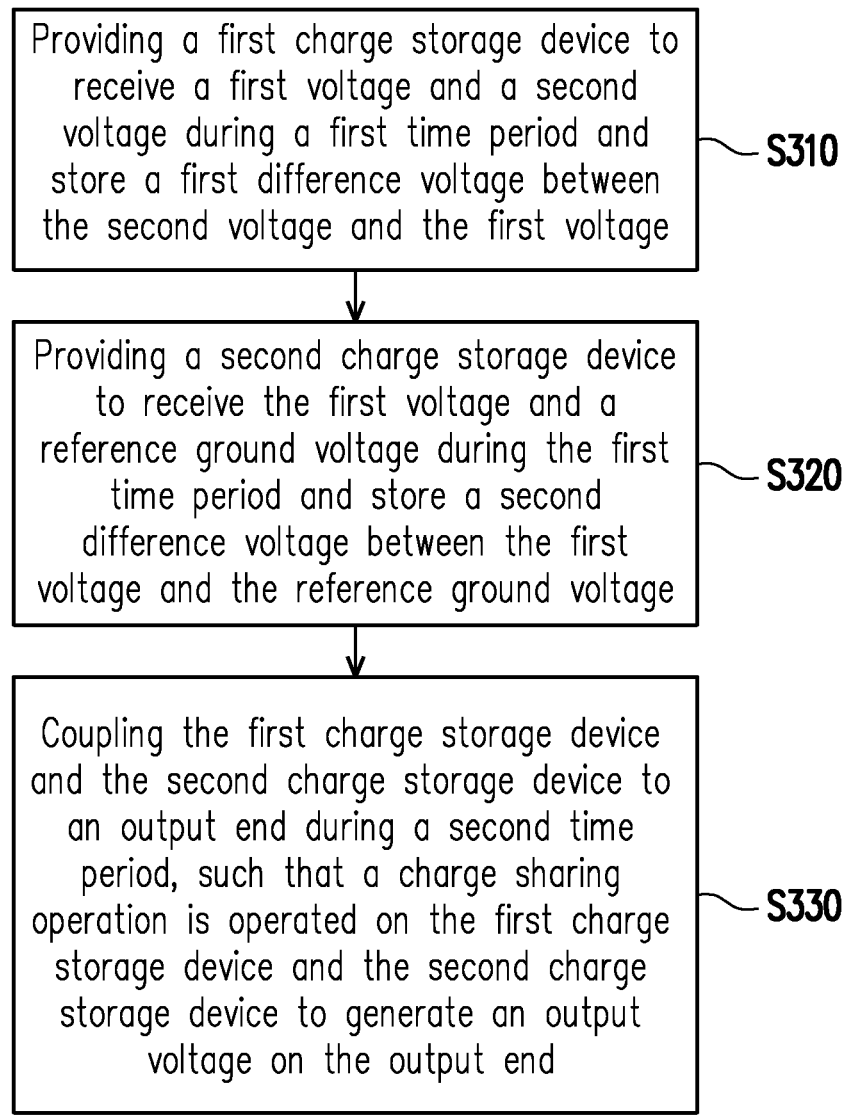
FIG. 3 is a flowchart illustrating an operation method for subtracting voltages according to an embodiment of the invention.

Referring to FIG. 3 hereinafter, FIG. 3 is a flowchart illustrating an operation method for subtracting voltages according to an embodiment of the invention. In step S310, a first charge storage device is provided to receive a first voltage and a second voltage during the first time period and store a first difference voltage between the second voltage and the first voltage. And, in step S320, a second charge storage device is provided to receive the first voltage and a reference ground voltage during the first time period and store a second difference voltage between the reference ground voltage and the first voltage. Then, in step S330, the first charge storage device, the second charge storage device and the parasitic capacitor are all coupled to an output end during the second time period, such that a charge sharing operation is operated on the first charge storage device, the second charge storage device and the parasitic capacitor, so as to generate an output voltage on the output end.

Details related to the aforementioned steps have been described with the embodiments set forth above and will not be repeated hereinafter.

It is to be additionally mentioned that the first time period occurs before the second time period, and the first time period does not overlap the second time period.

In light of the foregoing, the invention achieves generating the output voltage proportional to the voltage difference between the first voltage and the second voltage by configuring two sets of charge storage devices to operate storing operations for different difference voltages and then, operating the charge sharing operation with the charge storage devices and the parasitic capacitor. In this way, the voltage difference between the first voltage and the second voltage can be obtained according to the output voltage, so as to accurately complete the calculation operation of the voltage difference in the premise that the circuit area is not increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A voltage subtracter, comprising:
   a first charge storage device, receiving a first voltage and a second voltage during a first time period and storing a first difference voltage between the second voltage and the first voltage; and
   a second charge storage device, receiving the first voltage and a reference ground voltage during the first time period and storing a second difference voltage between the first voltage and the reference ground voltage;
   wherein the first charge storage device and the second charge storage device are coupled to an output end of the voltage subtracter during a second time period, such that a charge sharing operation is operated between the first charge storage device and the second charge storage device, so as to generate an output voltage on the output end of the voltage subtracter,
   wherein the first time period is before the second time period,
   wherein the second voltage is isolated from the output end of the voltage subtracter during the second time period.

2. The voltage subtracter according to claim 1, wherein the first charge storage device comprises: a capacitor, having a first end coupled to the output end of the voltage subtracter; a first switch, having first end receiving the second voltage and a second end coupled to first end of the capacitor, and controlled by a first control signal; a second switch, having first end receiving the first voltage and a second end coupled to the capacitor, and controlled by the first control signal; and a third switch, connected in series between the second end of the capacitor and the reference ground voltage, and controlled by a second control signal.

3. The voltage subtracter according to claim 2, wherein during the first time period, the first switch and the second switch are turned on, and the third switch is turned off, and during the second time period, the first switch and the second switch are turned off, and the third switch is turned on.

4. The voltage subtracter according to claim 2, wherein the first control signal and the second control signal are all kept in a disable level during a deadtime period.

5. The voltage subtracter according to claim 1, wherein the second charge storage device comprises:
   a capacitor, having a first end coupled to the output end of the voltage subtracter;
   a first switch, having a first end receiving the reference ground voltage and a second end coupled to the first end of the capacitor, and controlled by a first control signal;
   a second switch, having a first end receiving the first voltage and a second end coupled to the second end of the capacitor and controlled by the first control signal; and
   a third switch, connected in series between the second end of the capacitor and the reference ground end and controlled by a second control signal.

6. The voltage subtracter according to claim 5, wherein the second charge storage device further comprises: a fourth switch, connected in series on a path where the capacitor is coupled to the output end of the voltage subtracter and controlled by the second control signal.

7. The voltage subtracter according to claim 6, wherein the first switch, the second switch, the third switch and the fourth switch are transistor switches.

8. The voltage subtracter according to claim 5, wherein during the first time period, the first switch and the second switch are turned on, and the third switch is turned off, and during the second time period, the first switch and the second switch are turned off, and the third switch is turned on.

9. The voltage subtracter according to claim 5, wherein the first switch, the second switch and the third switch are transistor switches.

10. The voltage subtracter according to claim 5, wherein the first control signal and the second control signal are all kept in a disable level during a deadtime period.

11. The voltage subtracter according to claim 1, wherein the first voltage and the second voltage are analog voltages.

12. The voltage subtracter according to claim 1, wherein a voltage level of the output voltage is equal to a product of a difference value between the first voltage and the second voltage multiplied by a ratio.

13. An operation method for subtracting voltages, comprising:
   providing a first charge storage device to receive a first voltage and a second voltage during a first time period and store a first difference voltage between the second voltage and the first voltage;
   providing a second charge storage device to receive the first voltage and a reference ground voltage during the first time period and store a second difference voltage between the first voltage and the reference ground voltage; and coupling the first charge storage device and the second charge storage device to an output end of the voltage subtracter during a second time period, such that a charge sharing operation is operated on the first charge storage device and the second charge storage device to generate an output voltage on the output end of the voltage subtracter, wherein the first time period is before the second time period, wherein the second voltage is isolated from the output end of the voltage subtracter during the second time period.

14. The operation method for subtracting voltages according to claim 13, wherein the first voltage and the second voltage are analog voltages.

15. The operation method for subtracting voltages according to dam 13, wherein a voltage level of the output voltage is equal to a product of a difference value between the first voltage and the second voltage multiplied by a ratio.

16. The operation method for subtracting voltages according to claim 13, wherein the step of providing the first charge storage device to receive the first voltage and the second voltage during the first time period and store the first difference voltage between the second voltage and the first voltage comprises: configuring a first capacitor in the first charge storage device, and controlling the first capacitor to store the first difference voltage during the first time period.

17. The operation method for subtracting voltages according to claim 16, wherein the step of providing the second charge storage device to receive the first voltage and the reference ground voltage during the first time period and store the second difference voltage between the first voltage and the reference ground voltage comprises: configuring a second capacitor in the second charge storage device and controlling the second capacitor to store the second difference voltage during the first time period.

\* \* \* \* \*